Oct. 1, 1957　　　C. B. KRAUS　　　2,808,129
DOUBLE DISK BRAKE
Filed July 8, 1955　　　2 Sheets-Sheet 1
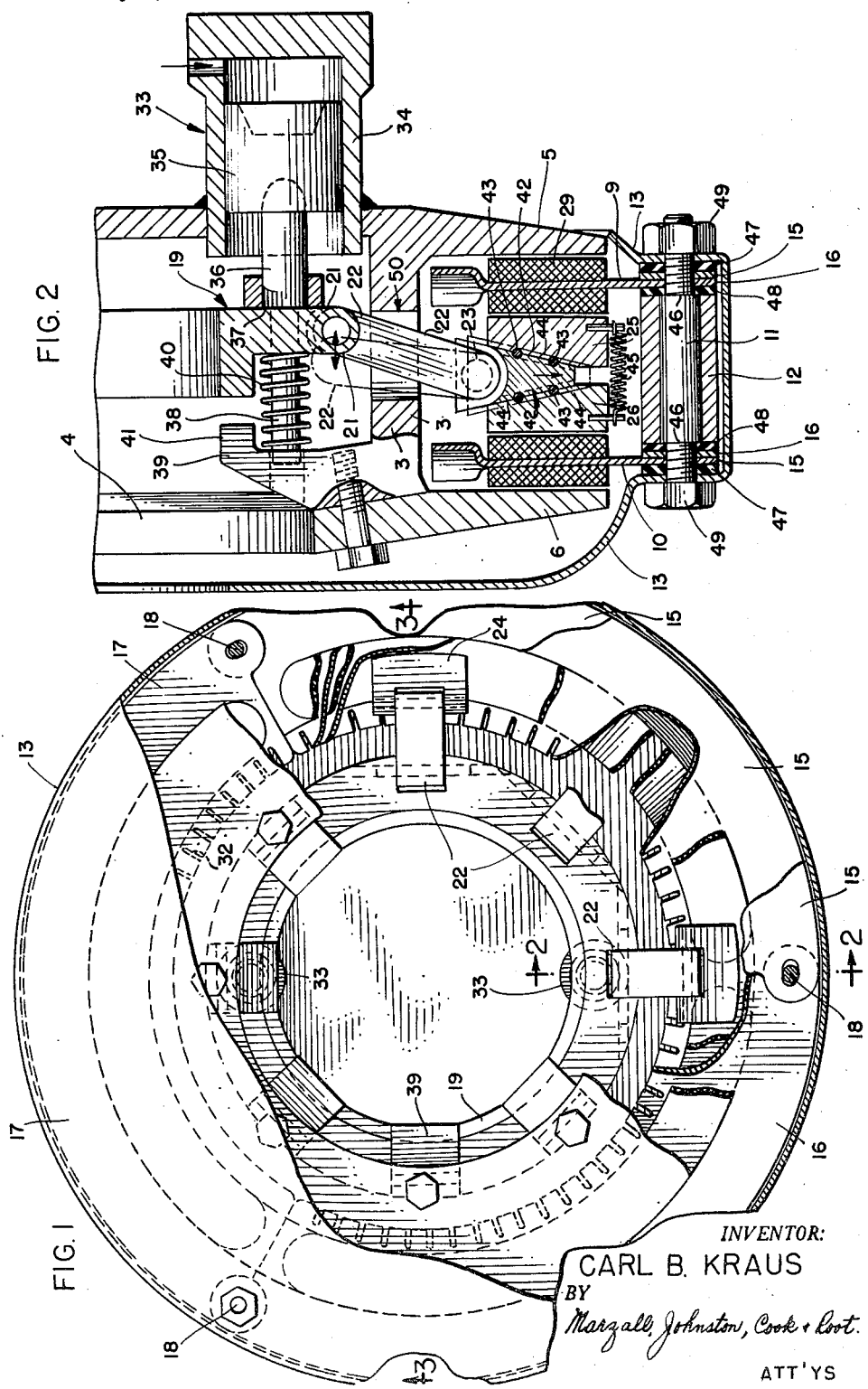
INVENTOR:
CARL B. KRAUS
BY
Mazzall, Johnston, Cook + Root.
ATT'YS Oct. 1, 1957  C. B. KRAUS  2,808,129
DOUBLE DISK BRAKE
Filed July 8, 1955  2 Sheets-Sheet 2
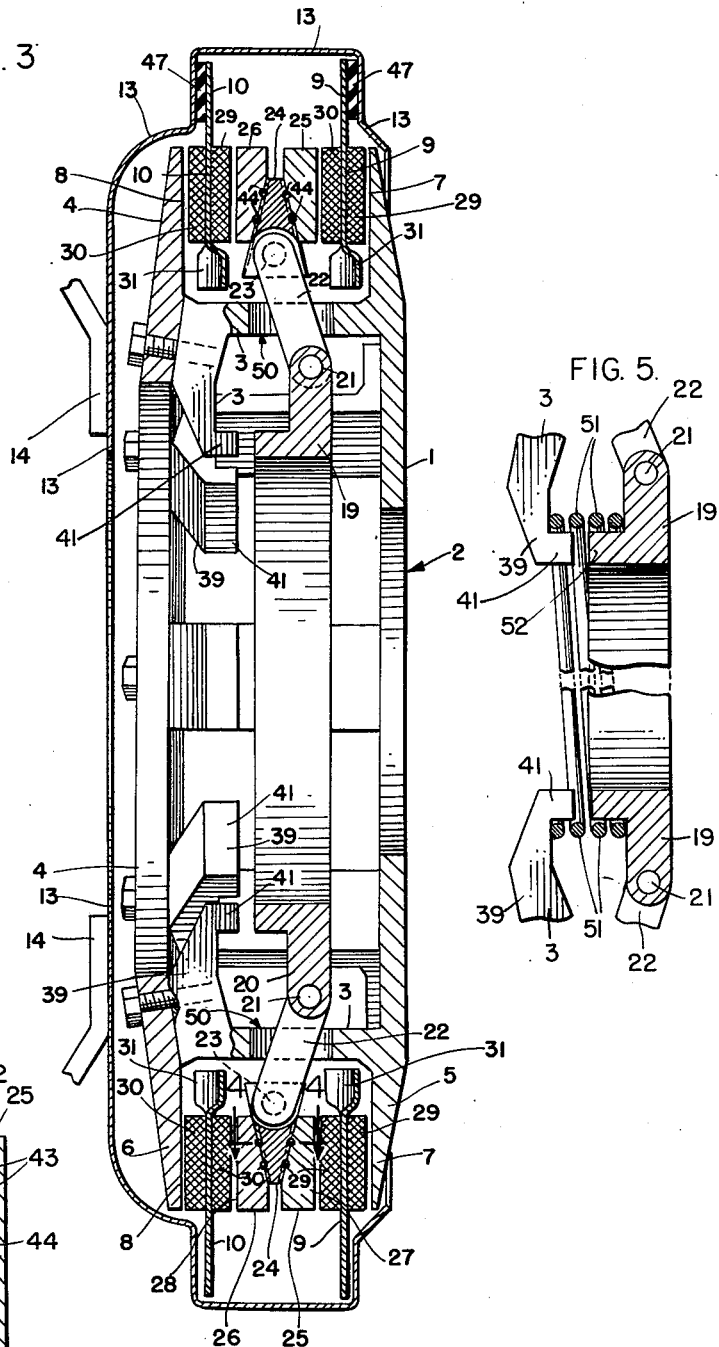
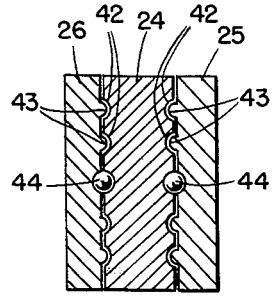
INVENTOR:
CARL B. KRAUS
BY
Marzall, Johnston, Cook, & Root.
ATT'YS

United States Patent Office 2,808,129
Patented Oct. 1, 1957

2,808,129

DOUBLE DISK BRAKE

Carl B. Kraus, Glencoe, Ill.

Application July 8, 1955, Serial No. 520,690

14 Claims. (Cl. 188—72)

This invention relates to brakes, particularly for use in connection with automotive vehicles, such as automobiles, trucks and the like, as well as for other devices. More specifically, the invention relates to brakes of the disk-type for use on said contrivances.

The invention consists, in general, of a disk brake embodying a pair of disks which rotate during the rotation or rotative movement of the device to be braked, such as an automobile wheel. Each of the disks is shown as embodying a plurality of segments or sections operatively connected together, to form, in effect, a singular circular or annular rotary disk, each disk being spaced apart a predetermined distance. Each disk is provided with brake material or lining on its opposite faces and is normally out of engagement with cooperating braking surfaces arranged on each side of each disk. The outer braking surfaces of each disk are arranged on the inner sides of rigid metal stationary rings, while the inner braking surfaces of each disk comprise stationary annular rings forming cooperating brake blocks. A non-rotating actuating ring is adapted to be shifted horizontally or laterally by hydraulic actuating devices comprising a cylinder and piston arrangement. The actuating ring is connected at various points about its periphery to a plurality of toggle members which are pivotally connected to spaced wedges. The actuating ring, when shifted by the hydraulic mechanism, causes corresponding shifting of the toggle mechanism whereby the circular integral brake blocks are adapted to be spread outwardly into contact with the brake disks, also causing the brake disks to be shifted laterally outwardly to bring the braking surfaces of the disks into contacting engagement with the spaced apart outer stationary rings. Pressure on the vehicle brake foot pedal, therefore, will shift the non-rotatable actuating ring and cause the wedges to be shifted outwardly radially to cause braking contact on both sides of each of the rotary brake disks and thus brake the vehicle. The multiple disk brake arrangement of the present invention is so formed and constructed as to provide air blades to scoop the air during rotation of the vehicle wheel, and thus dissipate heat which may be generated by the application of the brakes.

The primary object of the present invention is the provision of new and improved toggle mechanism, cooperating with wedge means for expanding continuous circular braking blocks which will cause braking contact with the brake blocks and with the inside surfaces of spaced apart exteriorly positioned metal rings having continuous braking surfaces about their peripheries.

Another important object of the invention consists in the provision of new and improved means for causing heat to be dissipated should any heat be generated because of the application of the brakes, or for any other reason.

A further object consists in the provision of new and novel means arranged in a particular manner and so constructed and positioned as to cause proper and positive application of the brakes, and to cause relatively soft or resilient operation of the brakes during continued operating pressure exerted or applied against the braking surfaces.

Numerous other objects and advantages will be apparent throughout the progress of the specification which is to follow.

The accompanying drawings illustrate a certain selected embodiment of the invention, and the views therein are as follows:

Fig. 1 is a detail elevational view of the brake mechanism constituting the invention, parts being broken away for the sake of clearness.

Fig. 2 is a detail longitudinal sectional view on the line 2—2 of Fig. 1.

Fig. 3 is a detail longitudinal sectional view on the line 3—3 of Fig. 1.

Fig. 4 is a detail sectional view on the line 4—4 of Fig. 3, and

Fig. 5 is a detail sectional view of the actuating ring with which a modified form of return spring is employed.

The particular construction herein disclosed for the purpose of illustrating the invention comprises a stationary ring 1 which is adapted to be secured to the axle housing (not shown) of an automotive vehicle, such as an automobile or truck. The stationary ring 1 is provided with an opening 2 through which the vehicle axle extends. The stationary ring 1 may be provided with a plurality of integral cross webs 3 which extend outwardly from the main body of the ring 1, and these webs are adapted to be secured to an outer stationary ring 4 also having a central axle receiving opening. The rings 1 and 4 are made relatively thick and circular in shape, and may be cast from suitable metal, such as iron or the like. The outer peripheral surfaces of the rings 1 and 4 terminate in reduced ends 5 and 6 respectively, and have braking surfaces 7 and 8 on their inner surfaces, Figs. 2 and 3. The braking surfaces 7 and 8, of the rigid rings 1 and 4, are arranged at the outer ends of the rings and have flat annular surfaces adapted to engage the outer braking surfaces of circular rotating braking disks 9 and 10.

A brake on an automotive vehicle is placed on the closest point to extremity of the fastest moving point and a problem has always been to get space for sufficient braking area. The braking disks 9 and 10 are properly driven at their outer extremity by the fastest moving part and are supported by means of periodically spaced bolts 11, Fig. 2, which pass through separator sleeves 12 arranged circumferentially about the periphery of the disks 9 and 10. The bolts 11 connect the disks 9 and 10 to an outside circular disk-like metal driving member 13 which is fixed to the vehicle wheel 14, Fig. 3, whereby the driving member 13 is rotated during the rotative movement of the wheel 14. Inasmuch as the brake disks 9 and 10 are secured to the driving member 13, by means of the peripherally arranged spaced apart bolts 11, the disks 9 and 10 will rotate along with their drive member 13 and the wheel 14 attached thereto. The braking members 9 and 10 are in the form of flat annular metal disks having large central openings through which the wheel axle extends. Each ring 9 and 10 is preferably made in three parts 15, 16 and 17, Fig. 1, and locked together in any suitable manner, such as by bolts or rivets 18.

A centrally disposed actuating ring 19, having a central opening, is arranged between the rigid stationary rings 1 and 4. The actuating ring 19 does not rotate, but is adapted to have horizontal or lateral limited slidable movement. The non-rotating slidable actuating ring 19 terminates about its periphery in an elongated flange 20, having slots or openings therein, and having connected thereto at 21, a plurality of spaced apart toggles 22. The outer end of each toggle 22 is pivotally connected at 23 to spaced wedges or wedge-like members 24 which are arranged between spaced braking blocks in the form of continuous rings 25 and 26. The spaced braking blocks or rings are adapted to cooperate with the wedges 24, the inner surfaces of the braking blocks 25 being provided with braking surfaces 27 and the outer surfaces of the braking blocks 27 being provided with braking surfaces 28. The braking disk 9, therefore, is adapted to cooperate with the braking surface 7 on the inside of the stationary ring 1 and with the braking surfaces 27 on the braking block ring 25. The braking disk 10 is adapted to cooperate with the braking surface 8 on the inside of the ring 4, and with the braking surfaces 28 on the braking block or ring 26. The braking rings or blocks 25 and 26 are spaced laterally apart and receive the wedges therebetween. Each wedge 24, therefore, cooperates with the braking block rings 25 and 26 to cause these rings to be spread apart laterally to effect a braking action with the disks 9 and 10.

The braking disks 9 and 10 are provided with brake material, or brake lining 29, on both sides of the disk 9, while the disk 10 is provided with the identical kind of brake lining or brake material arranged on each side of the disk 10, as indicated at 30, Figs. 2 and 3. The brake material 29 and 30 on the braking disks 9 and 10, respectively, may be made in separate sections or pieces in the same manner in which the disks 9 and 10 are made, that is, the disks 9 and 10 are made up of three segmental portions comparable to the sections 15, 16 and 17 of the brake disks. The braking material 29 and 30, on each side of the disks 9 and 10, is securely fixed to their respective disks 9 and 10 by bonding the same thereto, or by adapting any other suitable well-known process. For the purpose of the invention, therefore, the segments 15, 16 and 17 comprise the circular disks 9 and 10, even though the disks are made in sections rather than a one piece continuous circular integral member.

All brakes consist of braking blocks being applied against friction material (brake lining). This creates heat. Unless some means is provided to dissipate this heat, or the members are sufficiently heavy to absorb the heat, the sections will expand, and in the case of drum brakes, all braking action will be lost. Another effect of the heat is the decomposition of the usual rubber seals of the hydraulic pistons, therefore it is most important to rapidly dissipate the heat. Means are provided to dissipate heat by having the inner ends of the disks 9 and 10 deformed about their inner central openings to provide cooling fans or blades 31, 31, which extend completely about the inner annular edges of the braking disks 9 and 10. The cooling fans or blades 31 are formed by providing spaced cutouts 32, peripherally about the inner edges of the disks 9 and 10, and then bent outwardly to provide air scoops or air blades, so that during operation of the brake, the various parts of the brake mechanism and the braking surfaces may be cooled by the rotation of the disk 9 and 10 and, thus, dissipate heat from the operating parts of the brake mechanism.

Two or more hydraulic brake mechanisms 33, Figs. 1 and 2, may be employed to operate the actuating ring 19. These hydraulic operating members 33 are conventional in nature, and are operatively connected to the foot brake pedal (not shown) at the operator's stance at the vehicle in the usual conventional manner. The hydraulic devices 33 each comprise a hydraulic cylinder 34, Fig. 2, having a piston 35 arranged therein so that during operation of the usual foot pedal, the piston 35 will be adapted to move inwardly (to the left, Fig. 2). A piston rod 36 is adapted to be connected to each piston 35, and it may be provided with a shoulder 37 which is adapted to engage a surface of the actuating ring 19. Thus, when the piston 35 moves inwardly, the piston rod 36 will cause the actuating ring 19 to be moved inwardly. The inner lateral movement of the actuating ring 19 will shift the toggles 22 and cause the wedges 24 to be moved radially outward. This outward radial movement of each wedge 24 shifts the braking block rings 25 and 26 apart to bring the braking surfaces 27 and 28 of the braking block rings 25 and 26 into contacting braking engagement against the inner surfaces of the braking material 29 and 30 on the disks 9 and 10, respectively. Also, the inward movement of the wedges 24 further causes the braking surfaces 29 and 30 on the outer sides of the braking disks 9 and 10, respectively, to engage their cooperating braking surfaces 7 and 8 on the outer stationary rings 1 and 4, respectively. Pressure on the foot pedal, therefore, causes the hydraulic device 33 to cause braking pressure to be exerted on both sides of the braking rings 9 and 10, and thus brake the wheel, and consequently stop the vehicle.

There are at least four wheels on the usual automotive vehicle, and inasmuch as the brake construction of the present invention is identical with respect to each wheel to be braked, only one brake mechanism for one wheel is shown and described herein.

Inasmuch as the braking disks 9 and 10 each revolve during rotation of a wheel, and inasmuch as the rings 1 and 4 are stationary, and further because the annular braking blocks or rings 25 and 26 do not rotate, the rotative movement of the braking disks 9 and 10 will be braked, causing the wheels to be braked whenever the brake pedal is operated. The actuating ring 19 is stationary, that is, it does not rotate, but it does, of course, have lateral slidable movement when the hydraulic mechanism shifts the actuating ring 19.

The presure on the foot pedal, therefore, causes the hydraulic mechanism 33 to shift horizontally and slide the actuating ring 19 outwardly, whereupon the toggles 22 are shifted to force the wedges 24 radially outward. The brake blocks or rings 25 and 26 are thus forced apart causing the outer surfaces of the brake blocks or rings to engage the brake lining on the disks, as well as causing the brake lining on the outside of the disks to contact with the braking surfaces 7 and 8 on the rings 1 and 4, respectively.

Spaced pins 38, Fig. 2 (there being a pin 38 for each hydraulic device 33), are arranged between the actuating ring 19 and certain spaced lugs 39 formed on the webs 3 and fastened to the outer stationary ring 4. These members 38 are shown as an extension of the piston rod 36 and each member 38 extends through an opening in the ring 19 and through an opening formed in lug 39, as shown in Fig. 2. A coiled spring 40 is arranged about the pins 38 to return the ring 19 to normal non-braking position after the brake pedal is released. The lugs 39 may be provided with inwardly extended projections 41 so as to limit the inward operative movement of the ring 19.

The wedges 24 and the ring blocks 25 and 26 may be provided with respective spaced elongated grooves 42 on one member cooperating with beads 43 on the other member whereby the wedges 24 are maintained in proper position relative to the rings to prevent shifting of the wedges, Fig. 4. Also, spaced balls 44 may be arranged between the rings 25 and 26 and the wedges to prevent sticking or freezing of the wedges 24 to the brake block rings.

The brake block rings 25 and 26, of course, have sloping inward surfaces, as shown in Figs. 2 and 3, to correspond with the inclined side walls of the wedges 24. These rings 25 and 26 are, in fact, supported by the wedges 24, being supported by the wedges throughout various points of their peripheries. The annular brake blocks or rings 25 and 26 are connected together at various points about their peripheries by springs 45, Fig. 2, connected to opposed blocks, therefore, when the braking pressure on the foot pedal is released, the springs 45 will tend to pull the blocks 25 and 26 inwardly, and free the wedges 24 from the annular blocks 25 and 26 and, consequently, free the blocks 25 and 26 from the braking surfaces on the disks 9 and 10, and from the braking surfaces 7 and 8 and the rings 1 and 4, respectively. The braking action is immediately released automatically when the foot pedal is released. Means (not shown) are provided to cause operation of the hydraulic devices and to cause the devices to return to normal position in the usual conventional manner. Also, a hand brake or other parking brake construction (not shown) is employed to set the brakes manually during parking or otherwise.

Each spacer bolt 11, Fig. 2, may be offset or reduced at each end, as indicated at 46, and resilient washers 47 may be arranged between the opposed sides of the driven member 13, and, if necessary, additional flexible or resilient washer members 48 may be applied between the offset ends of the bolts and the brake disks 9 and 10. The bolts 11 may be provided with threads on each end, which threadingly engage nuts 49, although each bolt 11 may be made with the head on one end thereof and the parts locked together by using only one nut 49.

The pivotal connection 21 of the toggles 22 with the actuating ring 19, and the pivotal connection 23 of the toggles 22 with the wedges 24 are such, that in normal position, these pivot points will be offset, and at a substantial angle. However, as brake pressure is applied, the angle becomes progressively straight or relatively straight, thus affecting a soft resilient braking action as the applied braking force increases. The webs 3, which project outwardly from the rigid stationary ring 1, are provided with openings 50 to make room for the movement of the toggles, while the toggles are being moved by the actuating ring 19.

In Fig. 5 there is shown a modified form of means to release the brakes automatically. This modified form of arrangement employs a coil spring 51 instead of the coil springs 41 surrounding the pins 38, Fig. 2. The coiled spring 51, Fig. 5, is a helical spring which surrounds the collar or hub-like projection 52, Fig. 5, on the actuating ring 19 and is arranged inwardly of the connecting webs 3. The coil spring 51, therefore, is arranged outwardly of collar 52 and the projections 41 of the lugs 39 which are integral with the webs 3 of the ring 1. The spring 52 is an expansion spring which holds the actuating ring in normal inoperative position and is compressed when the hydraulic devices come into play. The spring 51 returns the actuating ring 19 to its normal inoperative position when the foot pedal is released and the hydraulic devices return to original non-operating position.

The invention provides an easy operating effective disk brake, preferably of the non-servo type, and creates a considerable amount of braking surface; and the braking is done progressively and resiliently to effect the optimum in braking action. Also, the braking structure of the present invention is provided with new and improved toggle mechanism for expanding or forcing outwardly the wedges, which, in turn, cause operation of the disks against the respective braking surfaces. It is desirable that several braking rings be employed and, while two brake disks are shown, additional braking rings may be employed for larger vehicles, particularly, trucks. Moreover, the brake construction shown may be multiplied in any way capable of performing proper braking function.

Changes may be made in the form, construction and arrangement of the parts, without departing from the spirit of the invention, or sacrificing any of its advantages, and the right is hereby reserved to make all such changes as fairly fall within the scope of the following claims.

The invention is hereby claimed as follows:

1. A disk brake comprising opposed annular braking blocks, a braking disk mounted on each side of the annular braking blocks, a non-rotatable actuating ring, wedges arranged between the spaced apart annular braking blocks and cooperating with the braking blocks, links pivotally connected to the actuating ring and to the wedges, and means to shift the actuating ring whereby shiftable movement of the actuating ring in a predetermined direction will move the wedges outwardly and, consequently, spread the annular braking blocks apart to cause engagement of said blocks with said disks, and means to rotate each braking disk simultaneously.

2. A disk brake comprising opposed annular braking blocks, a braking disk mounted on each side of the annular braking blocks, a non-rotatable actuating ring, wedges arranged between the spaced apart annular braking blocks, links having a pivotal connection at one end with the actuating ring and a pivotal connection with wedges at the other end, whereby shiftable movement of the actuating ring in a predetermined direction will move the wedges outwardly and, consequently, spread the annular braking blocks apart to cause engagement of said blocks with said disks, the pivotal connection of the links with the actuating ring being offset with respect to the pivotal connection of the links with the wedges, whereby the links are normally inclined, inward movement of the actuating ring causing the links to be moved radially toward a straight line position and shift the wedges radially outward, and means to rotate each braking disk simultaneously.

3. A disk brake comprising a pair of opposed annular braking blocks having their opposed inner surfaces inclined, a braking disk mounted on each side of the annular braking blocks, a stationary rigid ring arranged outwardly of each braking disk, a non-rotatable actuating ring, means to shift said actuating ring laterally, wedges arranged between the spaced apart annular braking blocks and having outwardly inclined surfaces cooperating with the inclined surfaces on the braking blocks, toggle link means having their inner ends pivotally connected to the actuating ring and their outer ends pivotally connected to the wedges whereby shiftable movement of the actuating ring in a predetermined direction will move the wedges outwardly and, consequently, spread the annular braking blocks apart to cause engagement of said blocks with said disks and a braking disk in engagement with a said stationary ring, and means to rotate each braking disk simultaneously.

4. A disk brake comprising a pair of opposed annular braking blocks having their opposed inner surfaces inclined, a braking disk mounted on each side of the annular braking blocks, a stationary rigid ring arranged outwardly of each braking disk, a non-rotatable actuating ring, means to shift said actuating ring laterally, wedges arranged between the spaced apart annular braking blocks and having outwardly inclined surfaces cooperating with the inclined surfaces on the braking blocks, toggle link means having their inner ends pivotally connected to the actuating ring and their outer ends pivotally connected to the wedges whereby shiftable movement of the actuating ring in a predetermined direction will move the wedges outwardly and, consequently, spread the annular braking blocks apart to cause engagement of said blocks with said disks and a braking disk in engagement with a said stationary ring, the pivotal connection of the toggle means with the actuating ring being offset with respect to the pivotal connection of the toggle means with the wedges, whereby the toggle means are normally inclined, and inward movement of the actuating ring causes the toggle means to move toward a straight line position and shift the wedges radially outward, and means to rotate each braking disk simultaneously.

5. A multiple disk brake comprising a pair of opposed rigid stationary rings having brake surfaces provided on their inner surfaces adjacent their peripheries, a brake disk arranged in close proximity to each ring, brake material arranged on both sides of each disk, a pair of spaced apart annular brake blocks arranged inwardly of said disks, a concentric non-rotatable but laterally shiftable actuating ring arranged below said annular brake blocks, wedges arranged between said brake blocks, toggles pivotally connected to said wedges and to said actuating ring at circumferentially spaced points, and means to shift said actuating ring laterally to cause said wedges to be shifted radially outward to spread said annular brake blocks outwardly to cause engagement of the brake blocks with the brake material on the inside surfaces of each disk and to cause the brake material on the outside surface of each disk to engage said annular brake surfaces on said first named rings, and means to rotate each braking disk simultaneously.

6. A multiple disk brake comprising a pair of opposed rigid stationary rings having brake surfaces provided on their inner surfaces adjacent their peripheries, a brake disk arranged in close proximity to each ring, brake material arranged on both sides of each disk, a pair of spaced apart annular brake blocks arranged inwardly of said disks, a concentric non-rotatable but laterally shiftable actuating ring arranged below said annular brake blocks, wedges arranged between said brake blocks, toggles pivotally connected to said wedges and to said actuating ring at circumferentially spaced points, means to shift said actuating ring laterally to cause said wedges to be shifted radially outward to spread said annular brake blocks outwardly to cause engagement of the brake blocks with the brake material on the inside surfaces of each disk and to cause the brake material on the outside surface of each disk to engage said annular brake surfaces on said first named rings, and a driving member connected to each brake disk and to a wheel of a vehicle.

7. A multiple disk brake comprising a pair of opposed rigid stationary rings having brake surfaces provided on their inner surfaces adjacent their peripheries, a brake disk arranged in close proximity to each ring, brake material arranged on both sides of each disk, a pair of spaced apart annular brake blocks arranged inwardly of said disks, a concentric non-rotatable but laterally shiftable actuating ring arranged below said annular brake blocks, wedges arranged between said brake blocks, toggles pivotally connected to said wedges and to said actuating ring at circumferentially spaced points, means to shift said actuating ring laterally to cause said wedges to be shifted radially outward to spread said annular brake blocks outwardly to cause engagement of the brake blocks with the brake material on the inside surfaces of each disk and to cause the brake material on the outside surface of each disk to engage said annular brake surfaces on said first named rings, and a driving member connected to each brake disk and to a wheel of a vehicle, said brake disks having their inner peripheral edges slit and deformed to provide fan-like blades so that during rotation of the wheels and the disks, an air movement is created to dissipate heat from the parts.

8. A vehicle brake comprising a pair of spaced disks, annular brake rings in the space between the disks, and means for spreading said disks apart to cause a brake action against the disks, said means comprising a non-rotatable laterally shifted actuating ring, wedges between the disk and said means, toggles pivotally connecting their outer ends to the wedges, means pivotally connecting the inner edges of the toggles to the actuating ring, the pivotal connection of the wedge with the toggle and the pivotal connection of the toggle with the actuating ring being offset laterally to incline each toggle, and means to shift the wedges radially outward, the annular inclination of the toggles decreasing during the shifting of the actuating ring toward actuating position.

9. A vehicle brake comprising a pair of spaced disks, annular brake rings in the space between the disks, and means for spreading said disks apart to cause a brake action against the disks, said means comprising a non-rotatable laterally shifted actuating ring, wedges between the disk and said means, toggles pivotally connecting their outer ends to the wedges, means pivotally connecting the inner edges of the toggles to the actuating ring, the pivotal connection of the wedge with the toggle and the pivotal connection of the toggle with the actuating ring being offset laterally to incline each toggle, and means to shift the wedges radially outward, the annular inclination of the toggles decreasing during the shifting of the actuating ring toward actuating position, each said brake ring having a central opening, each ring adjacent its opening having integral fan blades formed thereon.

10. A disk brake comprising opposed annular braking blocks, a braking disk arranged adjacent each block, wedge means between said blocks, a non-rotatable actuating ring connected to said wedge means, spring means normally maintaining said actuating ring in non-operating position, operable means to shift the actuating ring to operative position when operated and compressing said spring means when shifted, said spring means returning said actuating ring to normal position at the conclusion of the operation of the operable means.

11. A disk brake comprising opposed annular braking blocks, a braking disk arranged adjacent each block, wedge means between said blocks, a non-rotatable actuating ring connected to said wedge means, spring means normally maintaining said actuating ring in non-operating position, operable means to shift the actuating ring to operative position when operated and compressing said spring means when shifted, said spring means returning said actuating ring to normal position at the conclusion of the operation of the operable means, and spring means to return the actuating ring to normal inoperative position after the actuating ring has been shifted.

12. A disk brake comprising opposed annular braking blocks, a braking disk mounted on each side of the annular braking blocks, a non-rotatable actuating ring, wedges arranged between the spaced apart annular braking blocks and cooperating with the braking blocks, toggle links pivotally connected to the actuating ring and to the wedges, operable means adapted to be operated to shift the actuating ring when the operable means is operated, whereby shiftable movement of the actuating ring where operated will move the wedges outwardly and consequently spread the annular braking blocks apart to cause engagement of said blocks with said disks, and spring means to return the actuating ring to original normal position at the conclusion of the operation of the operable means.

13. A disk brake comprising opposed annular braking blocks, a braking disk mounted on each side of the annular braking blocks, a non-rotatable actuating ring, wedges arranged between the spaced apart annular braking blocks and cooperating with the braking blocks, toggle links pivotally connected to the actuating ring and to the wedges, operable means adapted to be operated to shift the actuating ring when the operable means is operated, whereby shiftable movement of the actuating ring where operated will move the wedges outwardly and consequently spread the annular braking blocks apart to cause engagement of said blocks with said disks, and spring means to return the actuating ring to original normal position at the conclusion of the operation of the operable means, the pivotal connection of the toggle links with the actuating ring being offset with respect to the pivotal connection of the toggle links with the wedges, whereby the toggle links are normally inclined, and inward movement of the actuating ring causes the toggles to move toward a straight line position and shift the wedges radially outward.

14. A disk brake comprising opposed annular braking blocks, a braking disk mounted on each side of the annular braking blocks, a non-rotatable actuating ring, wedges arranged between the spaced apart annular braking blocks and cooperating with the braking blocks, toggle links pivotally connected to the actuating ring and to the wedges, operable means adapted to be operated to shift the actuating ring when the operable means is operated, whereby shiftable movement of the actuating ring where operated will move the wedges outwardly and consequently spread the annular braking blocks apart to cause engagement of said blocks with said disks, and spring means to return the actuating ring to original normal position at the conclusion of the operation of the operable means, the pivotal connection of the toggle links with the actuating ring being offset with respect to the pivotal connection of the toggle links with the wedges, whereby the toggle links are normally inclined, and inward movement of the actuating ring causes the toggles to move toward a straight line position and shift the wedges radially outward, said spring means comprising helical expansion spring means arranged adjacent the actuating ring, said spring means being compressed when the operable means is operated.

References Cited in the file of this patent

UNITED STATES PATENTS

| | | |
|---|---|---|
| 1,843,594 | Baker | Feb. 2, 1932 |
| 2,344,933 | Lambert | Mar. 21, 1944 |

FOREIGN PATENTS

| | | |
|---|---|---|
| 1,074,409 | France | Mar. 31, 1954 |
| 675,961 | Great Britain | July 16, 1952 |